(12) United States Patent
Ma et al.

(10) Patent No.: US 7,875,252 B2
(45) Date of Patent: Jan. 25, 2011

(54) LIGHT-PIPE SYSTEM FOR LIGHTING, VENTILATION AND PHOTOCATALYTIC AIR PURIFICATION

(75) Inventors: Chongfang Ma, Beijing (CN); Yuanwei Lu, Beijing (CN); Yanpeng Wu, Beijing (CN); Yuting Wu, Beijing (CN); Wei Wang, Beijing (CN)

(73) Assignee: Beijing University of Technology of Pingleyuan

( * ) Notice: Subject to any disclaimer, the term of this patent is extended or adjusted under 35 U.S.C. 154(b) by 1261 days.

(21) Appl. No.: 11/005,106

(22) Filed: Dec. 6, 2004

(65) Prior Publication Data
US 2005/0220680 A1    Oct. 6, 2005

(30) Foreign Application Priority Data
Apr. 6, 2004  (CN) .......................... 2004 1 0029945
Oct. 29, 2004  (CN) .......................... 2004 1 0086705

(51) Int. Cl.
*B01J 19/08* (2006.01)
(52) U.S. Cl. ..................................... 422/186.3; 422/121
(58) Field of Classification Search ................. 422/121, 422/186.3; 362/576
See application file for complete search history.

(56) References Cited

U.S. PATENT DOCUMENTS

| | | | | |
|---|---|---|---|---|
| 2,924,165 A | * | 2/1960 | Doherty | ....................... 454/199 |
| 5,988,843 A | | 11/1999 | Handel | |
| 6,142,645 A | | 11/2000 | Han | |

* cited by examiner

*Primary Examiner*—Kishor Mayekar
(74) *Attorney, Agent, or Firm*—Leonard Tachner

(57) ABSTRACT

The invention relates to a light-pipe system for conducting/distributing light and air, which can also purify indoor air, particularly in a building, or the like. The light-pipe system includes a light-pipe for conducting light and having a clear top dome mounted at the top of the light-pipe to let in sunlight but keep out dust, rain and UV. An emitter fitted to the bottom of light-pipe improves the light distribution into the room, and a ventilation stack laid around the light-pipe coaxially/or non-coaxially, and a photocatalyst film (e.g. Nanometer TiO2) coated on the outer surface of the emitter for purifying indoor air under the illumination of light from light-pipe. The air and light are conducted separately along two different transport paths. The light-pipe system can provide illumination, ventilation and air purification simultaneously. The light source may be daylight, artificial light, light storage material or a mixture of them. Air can be moved naturally and/or is transported mechanically. Mirrors in the light-pipe may be used to control brightness and distribution.

11 Claims, 16 Drawing Sheets

LIGHT-PIPE SYSTEM FOR LIGHTING, VENTILATION AND PHOTOCATALYTIC AIR PURIFICATION

TECHNICAL FIELD

The present invention relates to the technical field of illumination, ventilation and air purification, and more particularly to a light-pipe system through which light and air can be transferred into an indoor room for illumination and air exchange and the indoor air can be purified by irradiating of the light conducted from the light-pipe.

BACKGROUND OF THE INVENTION

1. Cross-Related Applications

This application claims priority from Chinese Patent Application Serial Nos. 200410029945.2 filed Apr. 6, 2004 and 200410086705.6 filed Oct. 29, 2004, the disclosures of which are incorporated herein by reference.

2. Background Art

It is known to conduct or distribute air either in natural flow or mechanical flow in order to ventilate rooms of a building. It is also known to conduct or distribute light, as daylight or artificial light, for instance, to use daylight for illuminating large rooms.

A light-pipe is simply an empty tube along which light can travel into the interior of a building or other dark spaces. A coating on the internal surface of the light-pipe is composed of highly reflective material, which has reflectance greater than 95%. The light-pipe uses the principle of high efficiency reflection to transmit the light to the other end. Research on light-pipes started in 1880 in Russia, but they weren't put into mass production until 100 years later. At that time, the internal coating reflectivity was around 0.85. At the end of 1970s, a Canadian scholar put forward a method using the isosceles triangle prism with apex angle 90 as the film. The transmission efficiency was highly improved but costs were too great. Nowadays, the majority of commercially available light-pipe films are from 3M company and their film thickness is only 0.5mm.

The integration of light-pipe and ventilation technology is an original innovation in the light-pipe technology field. It can provide not only illumination but also ventilation, thus to improve the fresh air in buildings. U.S. Pat. No. 6,141,645 disclosed a skylight system which includes a skylight opening, a ventilator opening and an artificial lighting fixture at the roof of a room. Through three separate systems, it can realize the sun lighting, ventilation and the artificial lighting simultaneously. But this system is too large and complex.

In addition, U.S. Pat. No. 5,988,843 discloses a method and device for conducting/distributing air and light, particularly in a building or the like. The air and light are conducted along the same transport path. It also has an artificial lighting fixture in the light-pipe. Although this invention is structural simpler than that disclosed in U.S. Pat. No. 6,141,645, the light and air are conducted along the same transport path. Thus, after a considerable period of time, the dust will deposit in the duct, which will surely affect the transmission efficiency of light. So, it needs routine cleaning and thus increases maintenance cost.

There are no known reports about a light-pipe system integrated with photocatalytic air purification and ventilation. This invention not only can realize lighting and ventilation, but also can purify the indoor air. At the same time, the structural design of the light-pipe system is simple, can be easily installed and doesn't need periodic maintenance.

SUMMARY OF THE INVENTION

In order to overcome the drawbacks noted above, this invention uses two coaxial ducts. The interior conduit only transmits the light and the air flows through the annular passage formed between ventilation stack and light-pipe. More importantly, this invention uses a nanometer photocatalyst film which is coated on the outside surface of the emitter to purify the indoor air. The object of this invention is to realize lighting, ventilation and photocatalytic indoor air purification in buildings. Many measures are adopted in the present invention in order to achieve the above object. In one embodiment, the present invention provides a light-pipe system for use in the ceiling of a room in a structure having a roof.

According to the present invention, air and light are conducted along two different transport paths. The path for light, that is a light-pipe, is laid in the center of the path for air coaxially. Light is conducted into the interior of a building along the light-pipe, whereas, the air is flowed through the annular passage formed between the ventilation stack and light-pipe. The light-pipe comprises three components, that is:

(i) an outside collector (usually on the roof), generally a clear dome that removes UV radiation and acts as a cap to prevent dust and water from entering the pipe;
(ii) the light-pipe itself;
(iii) an emitter or luminaire that releases the light into the interior. The nanometer photocatalyst is coated on the outer surface of the emitter of the light-pipe to purify the indoor air under the illumination of transported light from the light-pipe.

The light source for the light-pipe may be any one of sunlight, artificial light, light storage material, the mixture of sunlight and artificial light, the mixture of sunlight and light storage materials or the mixture of sunlight, light storage materials and artificial light.

In a further embodiment of the invention, the light-pipe and the ventilation stack can be located on different axes, the light and the air is conducted through their own channels.

The air duct may be the building ventilation wall. Air can be moved naturally and/or is transported mechanically. A sunlight collector may be installed on the outside collector of light-pipe, or a sun tracker can be mounted on the said sunlight collector.

The photocatalyst film, loaded on the outer surface of the emitter, is an immersion coating, physical coating, or a mixture of an immersion coating and physical coating, the material of which can be anyone of the following, that is nanometer $TiO_2$, nanometer modified $TiO_2$, nanometer modified meso-pore $TiO_2$, nanometer titanium free composite oxide or other semiconductor material.

The photocatalyst film can contain the absorptive material, which can absorb the polluted gas.

In another embodiment of the invention, the air and light may enter a building through separate ports of air and light, the air is conducted in a transport direction from indoor to outdoor, or from outer door to indoor, or mixture of both Other objects and features of the invention will be apparent from a description of the accompanying drawings.

BRIEF DESCRIPTION OF THE DRAWINGS

The various embodiments, features and advances of the present invention will be understood more completely hereinafter as a result of a detailed description thereof in which reference will be made to the following drawings.

DESCRIPTION OF THE PREFERRED EMBODIMENTS

Embodiment 1

Figure 1:
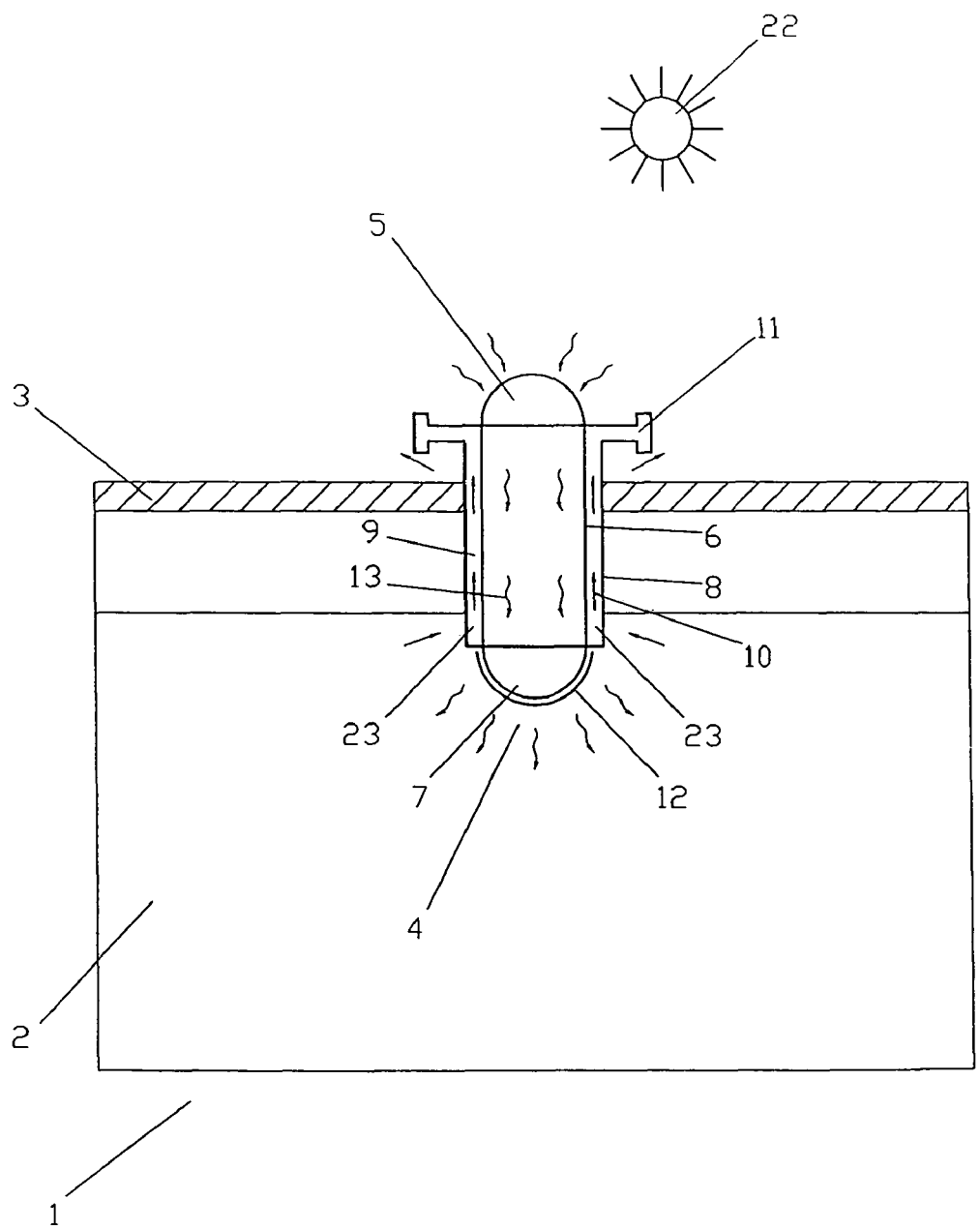
FIG. 1 is a full section view of light-pipe system with structure for natural ventilation and photocatalytic air purification mounted on the ceiling of a room.

FIG. 1 shows a building 1 which has at least one room 2 with a roof 3. The light-pipe system 4 for natural ventilation and photocatalytic air purification is installed on the roof 3 of room 2. The light-pipe system 4 comprises a light-pipe device and ventilation stack 8, of which the light-pipe device includes outer light collector 5 for collecting light, light-pipe 6 itself for conducting light and emitter 7 fitted to the bottom of light-pipe 6 for diffusing light and preventing the dust from entering into the interior of the light-pipe 6. The sunlight 22 collected by the light collector 5 of light-pipe 6 is conducted into the interior of building 1. The natural ventilation is achieved along ventilation passage 9 through air port 23 as a result of the temperature difference between indoors and outdoors or the pressure difference due to wind flow around light-pipe outlet. In order to prevent or increase the wind effect, ventilation terminals 11 are used. The nanometer photocatalyst $TiO_2$ 12 is coated on the surface of emitter 7 of light-pipe 6. Under the illumination of transport light from the light-pipe, the indoor air can be purified. In this application, the directional arrow 10 on a linear course depicts the direction of airflow. The arrows 13 depicting the light are not uniformly curved.

This light-pipe system 4 can realize day-lighting, natural ventilation and air purification simultaneously.

Embodiment 2

Figure 2:
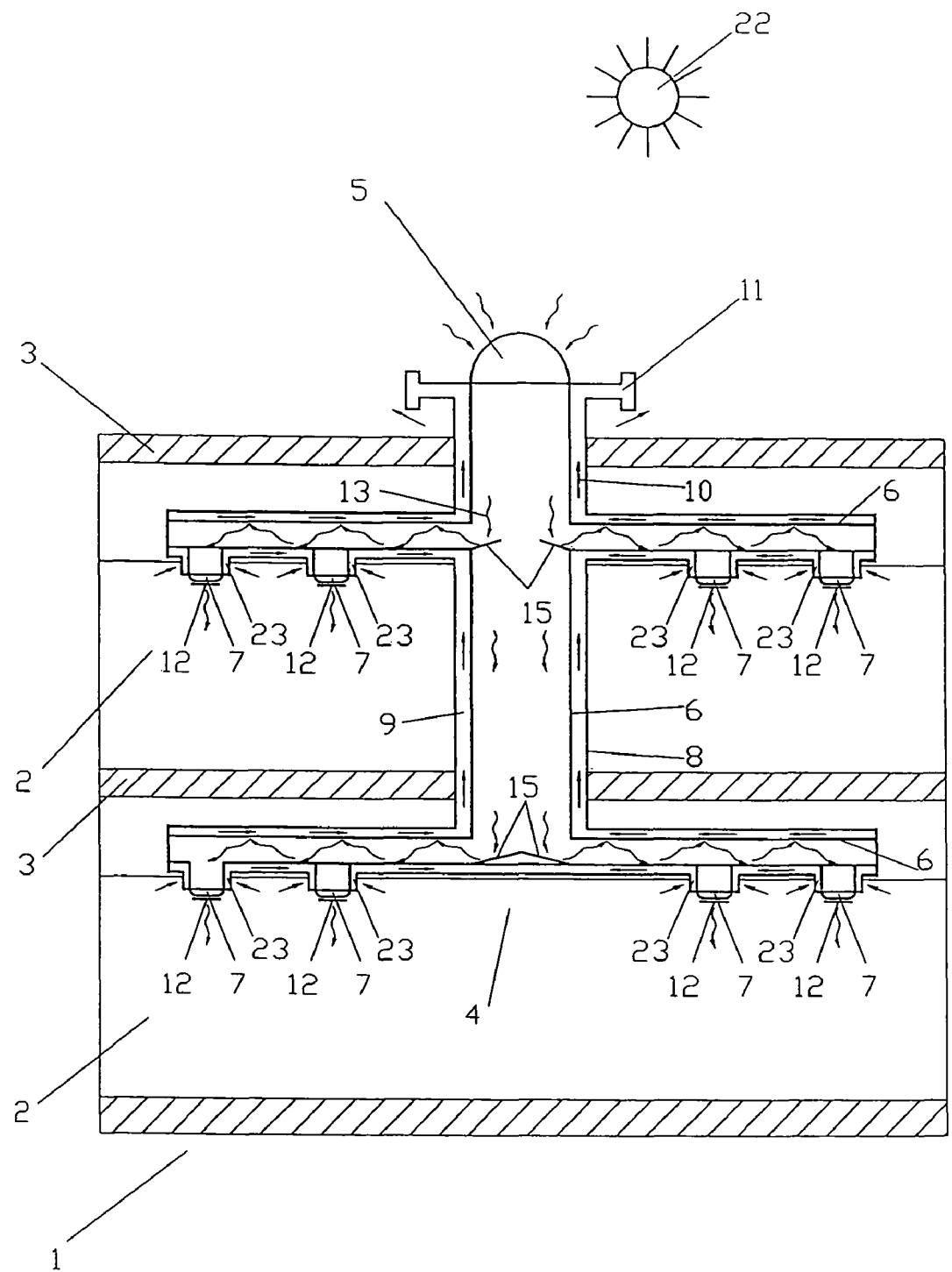
FIG. 2 is a full section view of light-pipe system with structure for natural ventilation and photocatalytic air purification mounted on the ceiling of multi-floors of a building.

FIG. 2 shows a building 1 having several rooms 2 with a roof 3. The light-pipe system 4 for natural ventilation and photocatalytic air purification is installed on the roof 3 of room 2. Each room 2 has a horizontal light-pipe 6 connected with vertical light-pipe 6 in the region of its ceiling. The individual horizontal light-pipes 6 are connected to each other by vertical light-pipe 6. Light from the sun 22 passes through the light collector 5 and enters the vertical light-pipe 6. Light is directed into the horizontal light-pipe 6 where it then emerges through light ports (emitter fitted to the light ports) 7. The air port 23 takes up exhaust air, i.e., the room air of the room 2 passes into the corresponding horizontal air passage 9 within wall 8 and, then passes out of the room 2 from ventilation terminals 11 via the central vertical air passage 9 through chimney-like action. The nanometer photocatalyst TiO2 12 is coated on the surface of emitter 7 of light-pipes 6. Under the illumination of light conducted by light-pipe, the indoor air can be purified. A hinged mirror 15 is arranged in the horizontal light-pipes 6 to distribute the light homogeneously. This light-pipe system 4 can realize day-lighting, natural ventilation and air purification in multi-floors of a building simultaneously.

Embodiment 3

Figure 3:
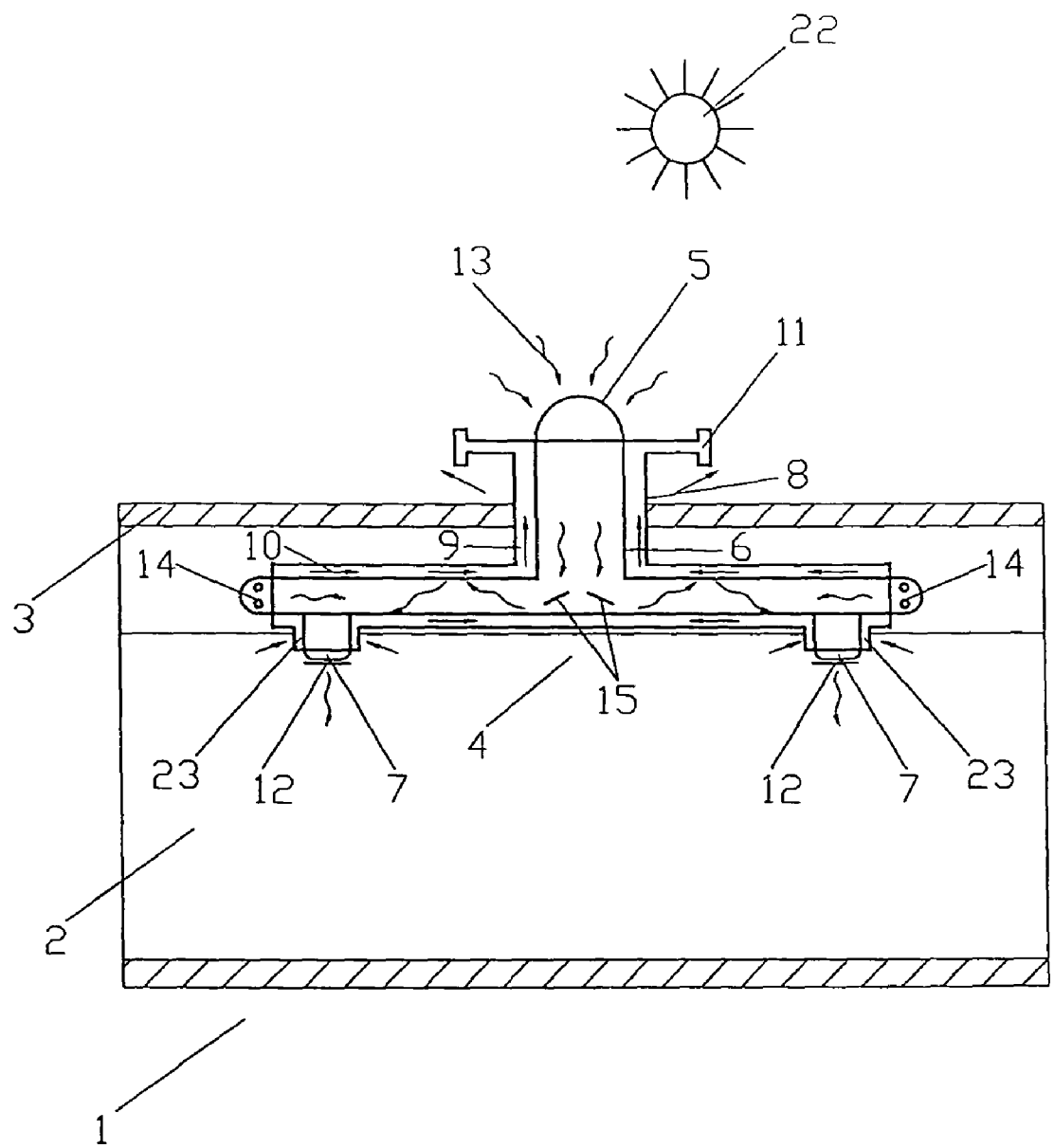
FIG. 3 is a full section view of light-pipe system with structure for natural ventilation, photocatalytic air purification and artificial lighting mounted on the ceiling of a room.

FIG. 3 shows a building 1, at least having a room 2 with a roof 3. The light-pipe system 4 for natural ventilation and photocatalytic air purification installed on the roof 3 of room 2 in a manner similar to FIG. 2. The only difference is that artificial lights 14 are installed on the two ends of horizontal light-pipe 6. The light source of light-pipe 6 can be daylight or/and artificial light. The light-pipe system can conduct daylight, artificial lighting, natural ventilation and air purification.

Embodiment 4

Figure 4:
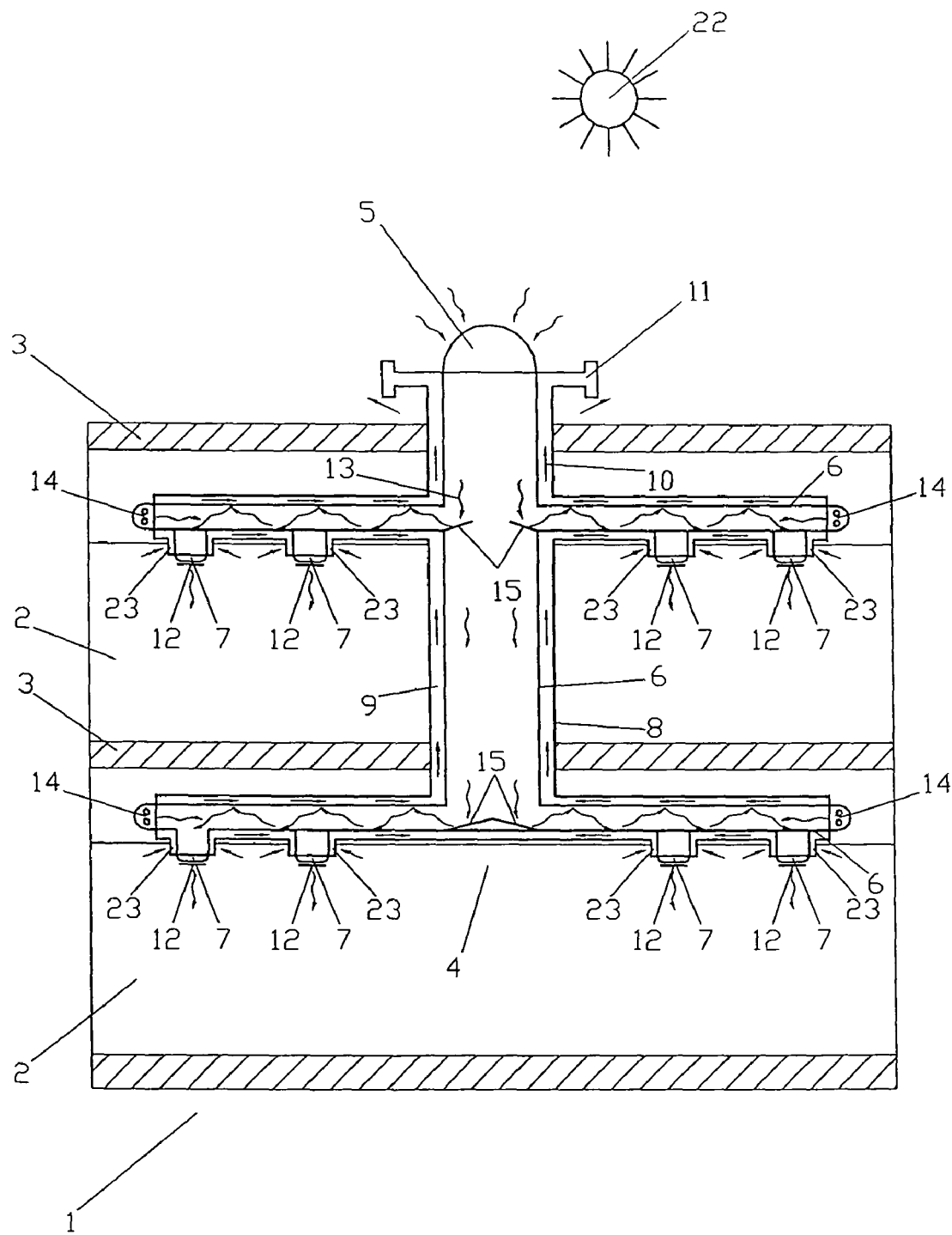
FIG. 4 is a full section view of light-pipe system with structure for natural ventilation, photocatalytic air purification and artificial lighting mounted on the ceiling of multi-floors of a building.

FIG. 4 shows the light-pipe system 4, which is similar to that of FIG. 3. The only difference is that this system can be fitted to multi-floors of buildings.

Embodiment 5

Figure 5:
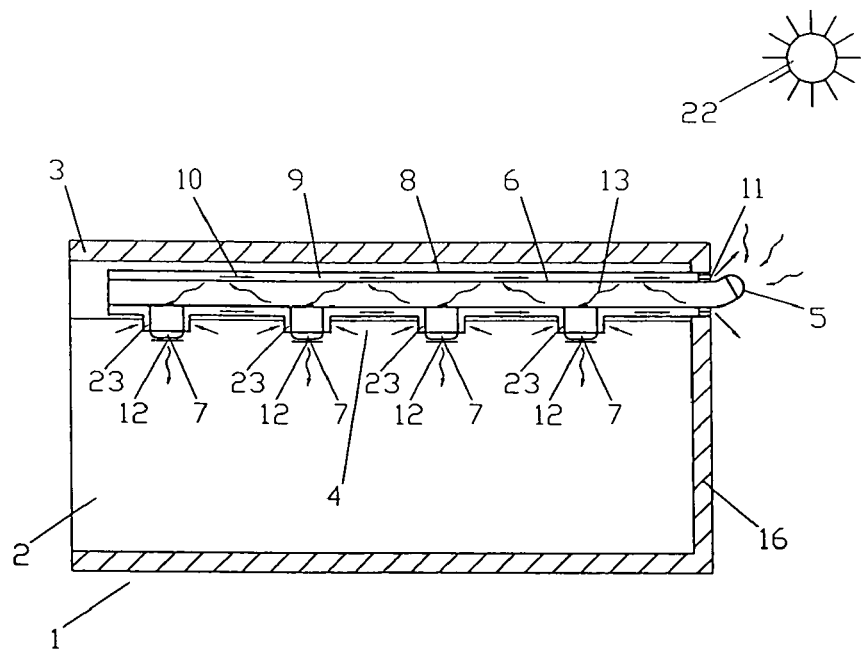
FIG. 5 is a full section view of light-pipe system with structure for natural ventilation and photocatalytic air purification mounted on the sidewall of a room.

FIG. 5 shows a building 1, at least having a room 2 with a roof 3. The light-pipe system 4 for natural ventilation and photocatalytic air purification is installed on the sidewall 16 of room 2. The sunlight from sun 22 collected by the light collector 5 enters the horizontal light-pipe 6 and passes into room 2 through light ports (emitter fitted to the light ports) 7. The exhaust air, i.e., the room air of the room 2 is taken into air duct 9 through air port 23 and is passed out the room 2 through ventilation terminals 11. The nanometer photocatalyst (modified TiO2) 12 is coated on the surface of the emitter 7 of light-pipe 6. Under the illumination of light conducted by light-pipe, the indoor air can be purified.

Embodiment 6

Figure 6:
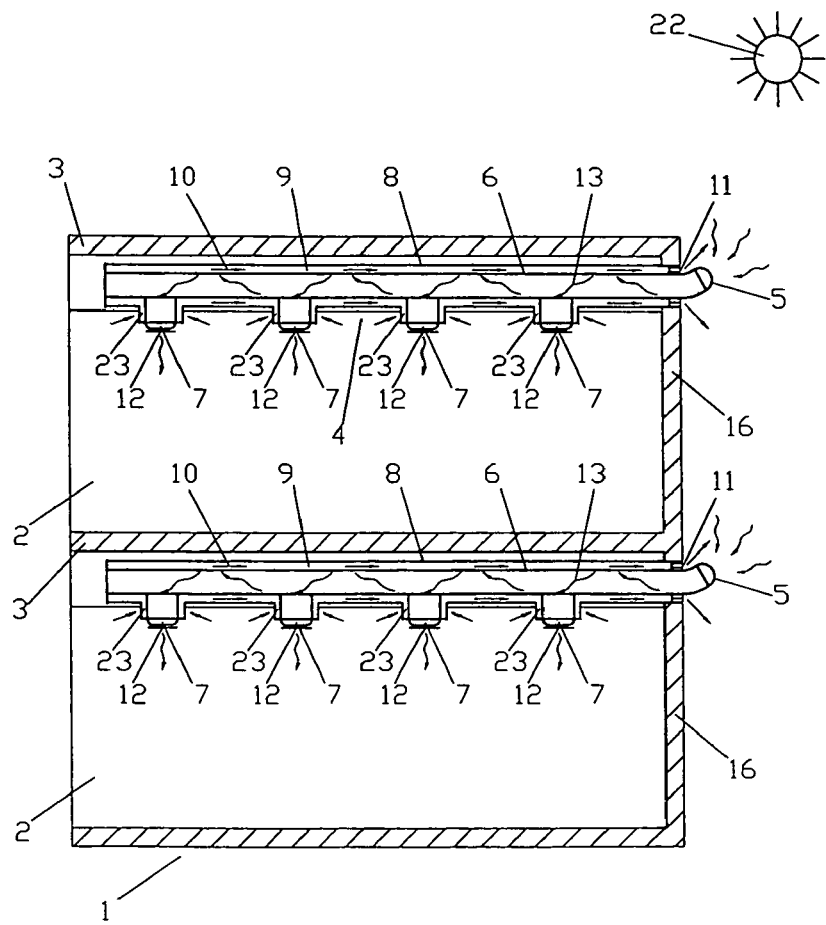
FIG. 6 is a full section view of light-pipe system with structure for natural ventilation and photocatalytic air purification mounted on the sidewall of multi-floors of a building.

FIG. 6 shows the light-pipe system 4, which is similar to that of FIG. 5. The only difference is that this system 4 can be fitted to multi-floors of a building 1.

Embodiment 7

Figure 7:
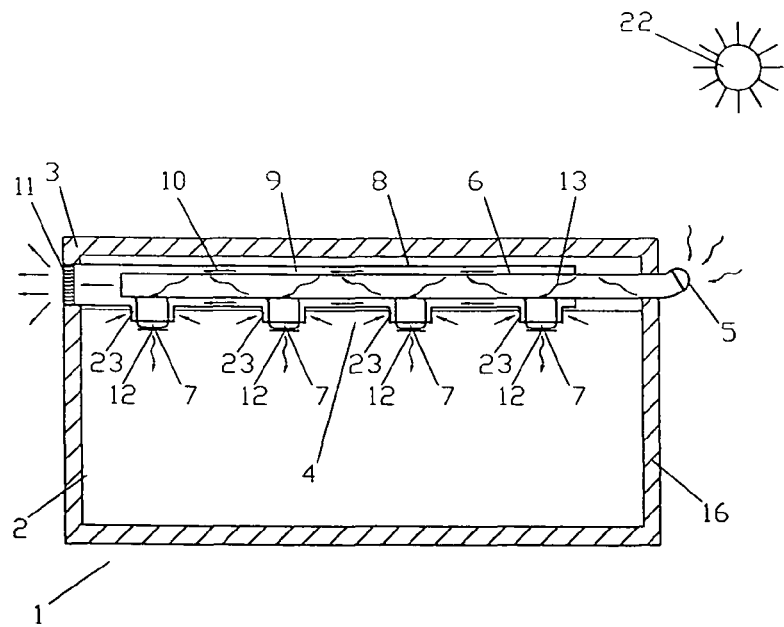
FIG. 7 is another full section view of light-pipe system with structure for natural ventilation and photocatalytic air purification mounted on the sidewall of a room.

FIG. 7 shows the light-pipe system 4, which is similar to that of FIG. 5. The only difference is that the ventilation terminal 11 is located on the opposite sidewall 16 of room 2.

Embodiment 8

Figure 8:
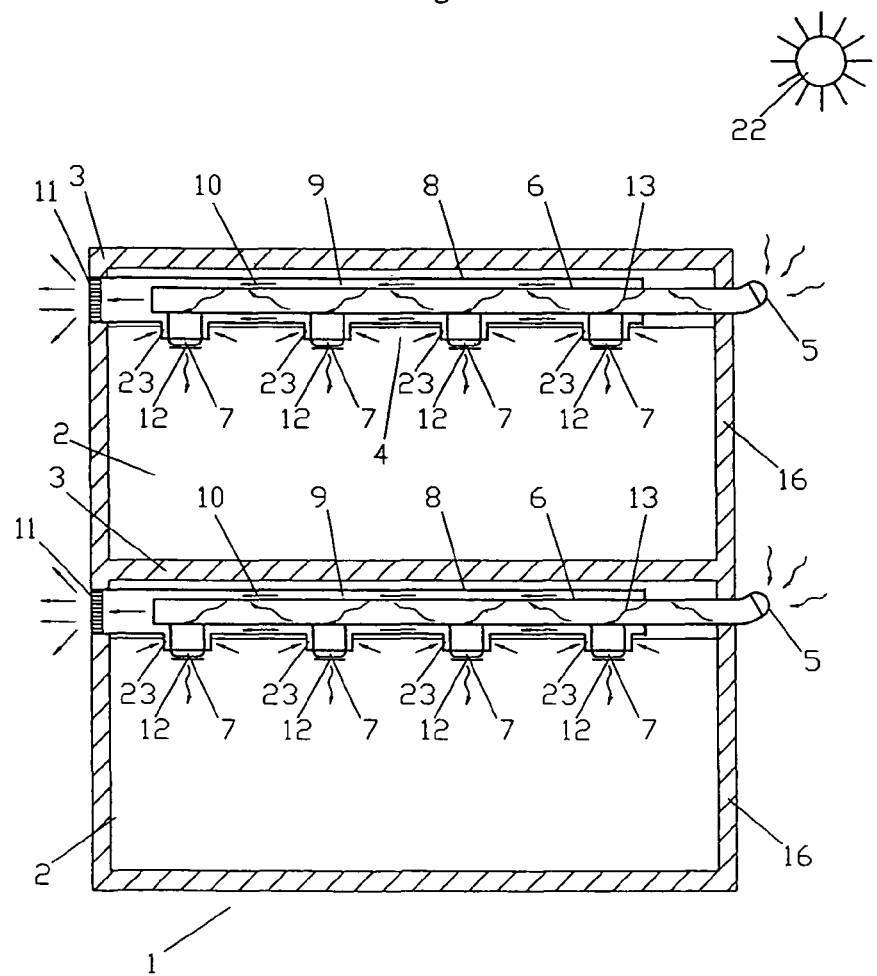
FIG. 8 is another full section view of light-pipe system with structure for natural ventilation and photocatalytic air purification mounted on the sidewall of multi-floors of a building.

FIG. 8 shows the light-pipe system 4, which is similar to that of FIG. 7. The only difference is that the system 4 can be fitted to multi-floors of a building 1.

Embodiment 9

Figure 9:
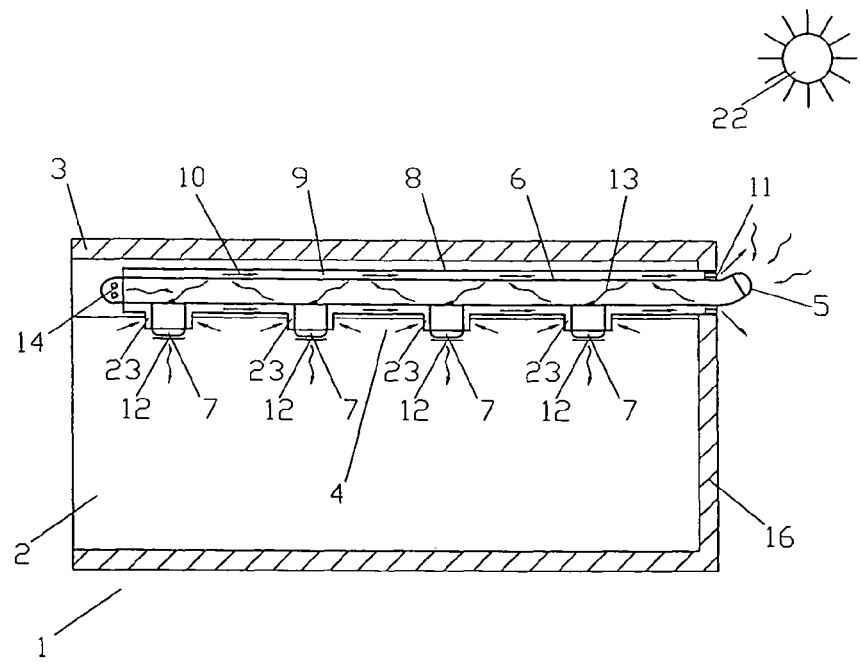
FIG. 9 is a full section view of light-pipe system with structure for natural ventilation, photocatalytic air purification and artificial lighting mounted on the sidewall of a room.

FIG. 9 shows the light-pipe system 4, which is similar to that of FIG. 5. The only difference is that an artificial light is provided at the other end of light-pipe 6, so that room 2 can be provided with daylight, artificial light or with a mixture of both.

Embodiment 10

Figure 10:
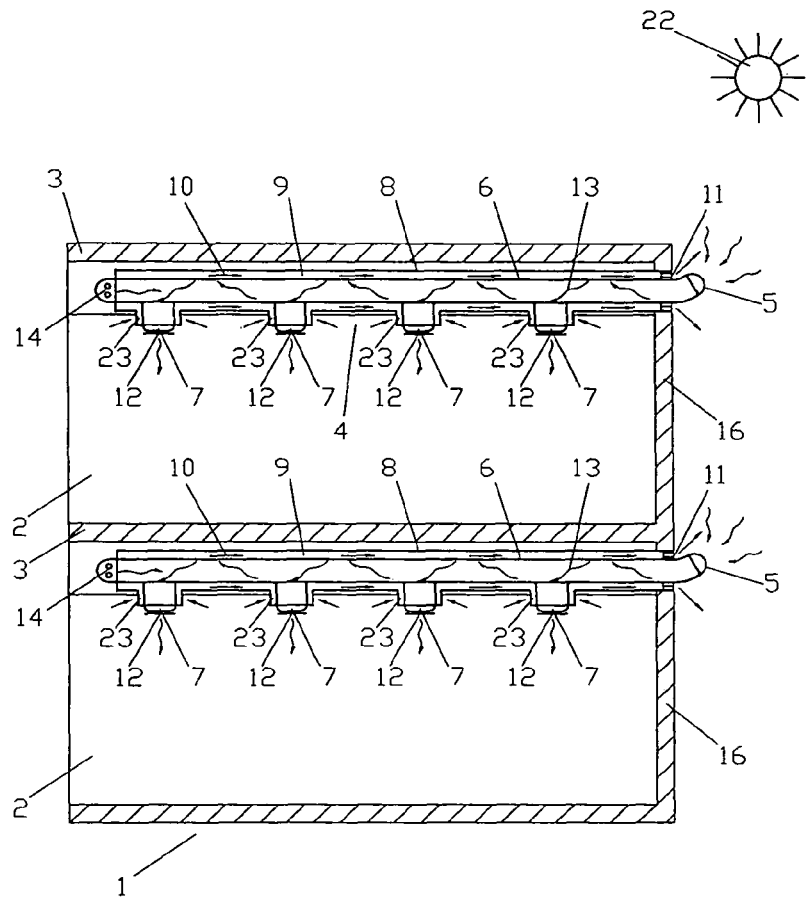
FIG. 10 is a full section view of light-pipe system with structure for natural ventilation, photocatalytic air purification and artificial lighting mounted on the sidewall of multi-floors of a building.

FIG. 10 shows the light-pipe system 4, which is similar to that of FIG. 9. The only difference is that the system 4 can be fitted to multi-floors of buildings.

Embodiment 11

Figure 11:
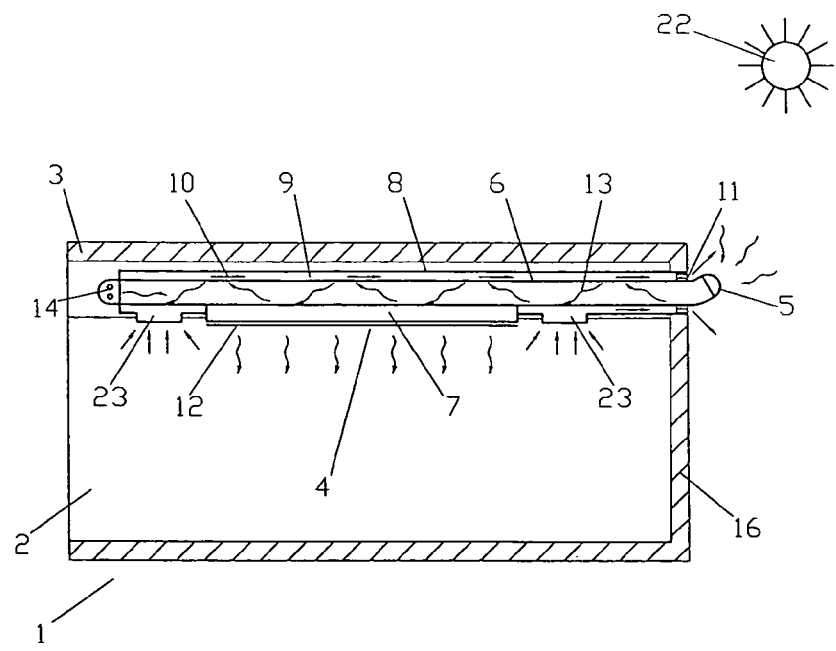
FIG. 11 is a full section view of slot type light-pipe system with structure for natural ventilation, photocatalytic air purification and artificial lighting mounted on the sidewall of a room.

FIG. 11 shows the light-pipe system 4, which is similar to that of FIG. 9. The only difference is that the light-pipe 6 is slot type. The exhaust air, i.e., the room air of room 2 is taken into air duct 9 through air port 23 and is passed out of room 2 through ventilation terminals 11. The nanometer photocatalyst (modified nanometer meso-pore TiO2) 12 is coated on the surface of the slot type emitter 7 of light-pipe 6. Under the illumination of light conducted by the light-pipe, the indoor air can be purified.

Embodiment 12

Figure 12:
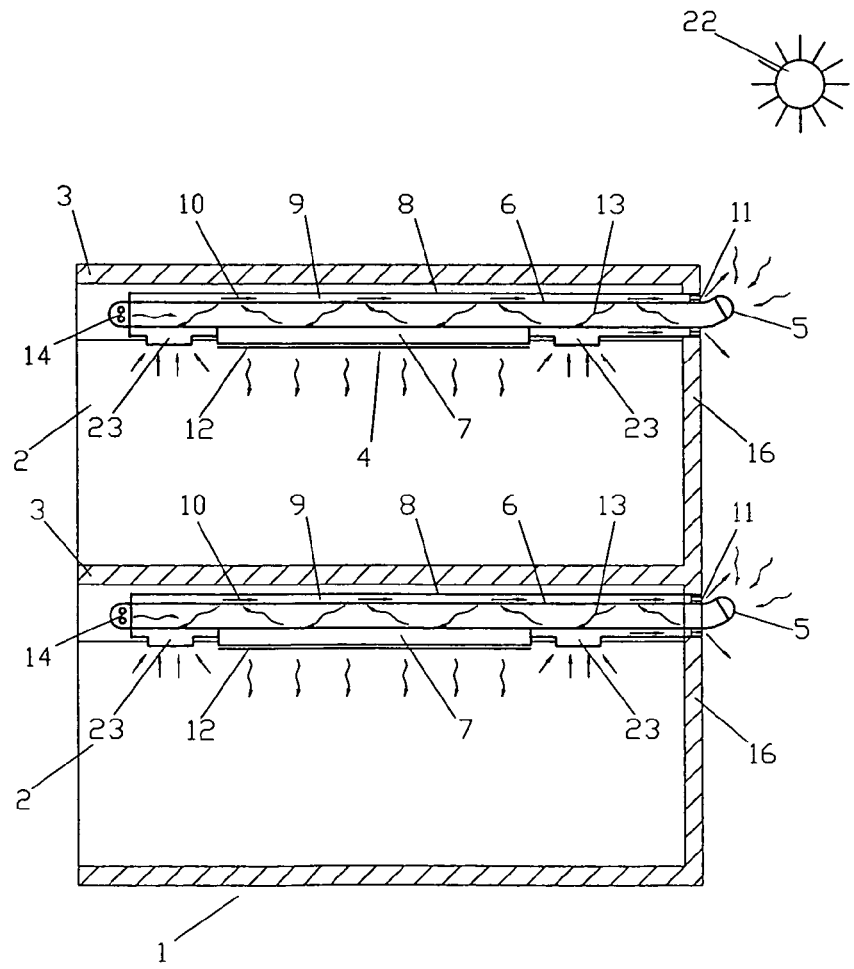
FIG. 12 is a full section view of slot type light-pipe system with structure for natural ventilation, photocatalytic air purification and artificial lighting mounted on the sidewall of multi-floors of a building.

FIG. 12 shows the light-pipe system 4, which is similar to that of FIG. 11. The only difference is that the system 4 can be fitted to multi-floors of buildings.

Embodiment 13

Figure 13:
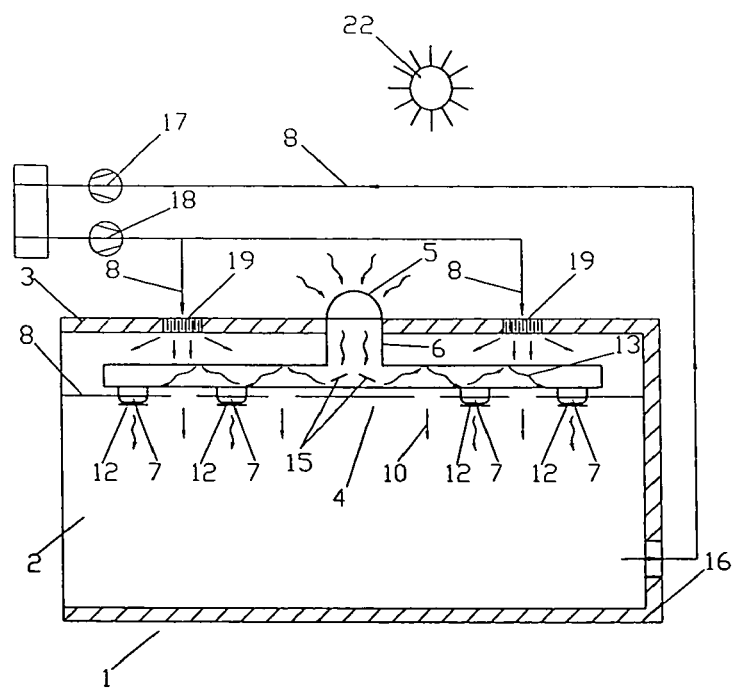
FIG. 13 is a full section view of light-pipe system with structure for mechanical ventilation and photocatalytic air purification mounted on the ceiling of a room.

FIG. 13 shows a building 1, at least having a room 2 with a roof 3, the light-pipe system 4 for ventilation and photocatalytic air purification is installed on the ceiling 3 of room 2. The sunlight from sun 22 collected by the outer collector 5 of light-pipe 6 is conducted into the horizontal light-pipe 6 and then enters the interior of room 2 through light ports (emitter) 7. A hinged mirror 15 is arranged in the horizontal light-pipe 6 to distribute the light. The indoor exhaust air can be removed from room 2 by separate fan 17 communicating through an exhaust duct 8. Outdoor air can be introduced into the interior of room 2 through inlet duct 8 by fan 18. The air flows through the dust filter 19 to arrive at the interior of the room. The modified nanometer meso-pore photocatalyst TiO2 12 is coated on the surface of emitter 7. Under the illumination of light conducted by the light-pipe, the indoor air can be purified. This light-pipe system 4 can realize the day-lighting, mechanical ventilation and air purification simultaneously.

Embodiment 14

Figure 14:
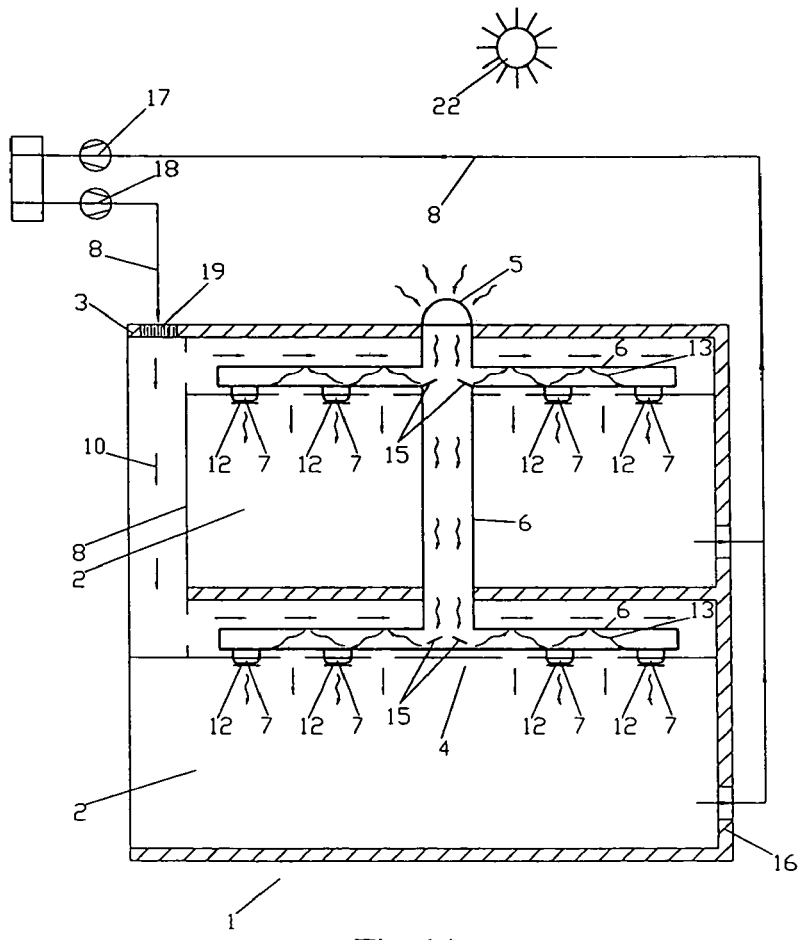
FIG. 14 is a full section view of light-pipe system with structure for mechanical ventilation and photocatalytic air purification mounted on the ceiling of multi-floors of a building.

FIG. 14 shows the light-pipe system 4, which is similar to that of FIG. 13. The only difference is that the system 4 can be fitted to multi-floors of buildings.

Embodiment 15

Figure 15:
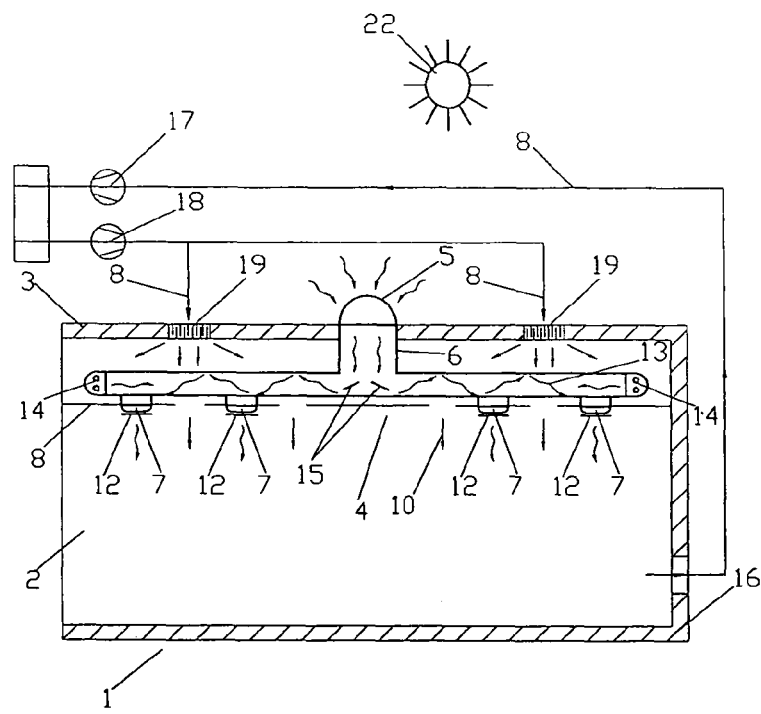
FIG. 15 is a full section view of light-pipe system with structure for mechanical ventilation, photocatalytic air purification and artificial lighting mounted on the ceiling of a room.

FIG. 15 shows the light-pipe system 4, which is similar to that of FIG. 13. The only difference is that the artificial lights 14 are installed at both ends of light-pipe 6, so that the room 2 can be provided with daylight, artificial light or with a mixture of both.

Embodiment 16

Figure 16:
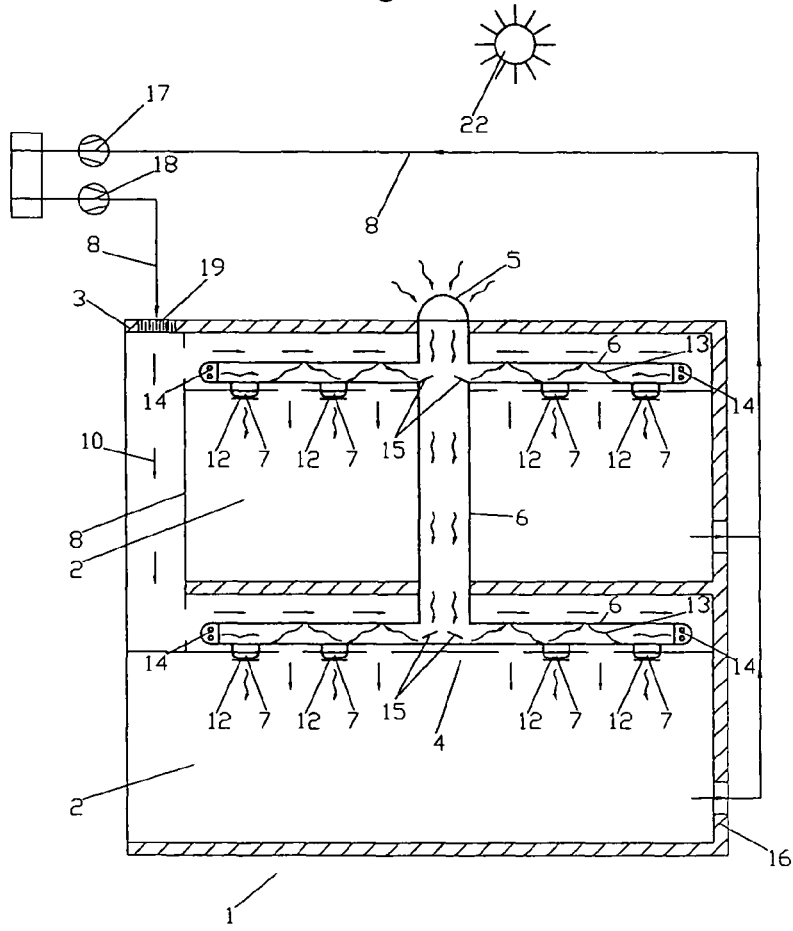
FIG. 16 is a full section view of light-pipe system with structure for mechanical ventilation, photocatalytic air purification and artificial lighting mounted on the ceiling of multi-floors of a building.

FIG. 16 shows the light-pipe system 4, which is similar to that of FIG. 15. The only difference is that the system 4 can be fitted to multi-floors of buildings.

Embodiment 17

Figure 17:
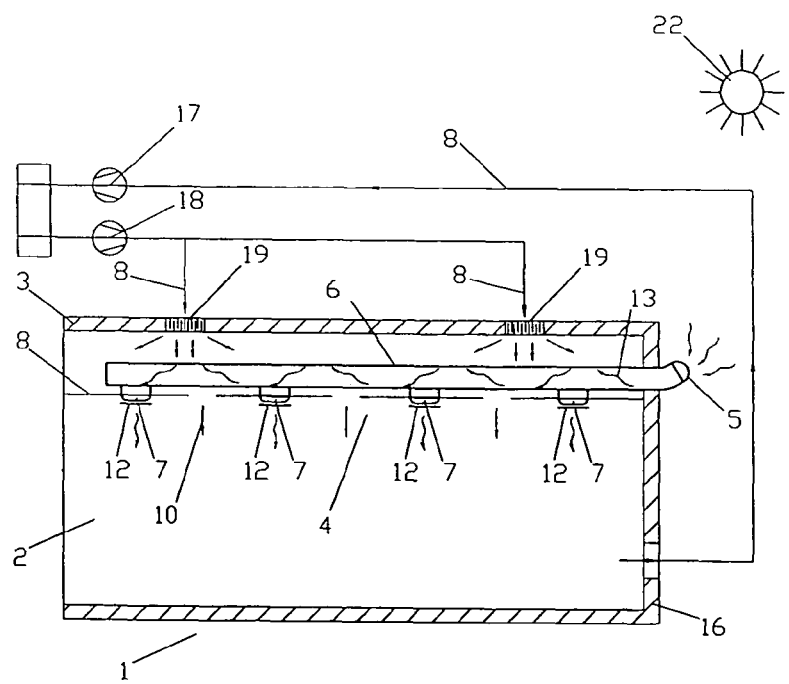
FIG. 17 is a full section view of light-pipe system with structure for mechanical ventilation and photocatalytic air purification mounted on the sidewall of a room.

FIG. 17 shows the light-pipe system 4, which is similar to that of FIG. 13. The only difference is that the light-pipe is installed on the sidewall 16 of room 2.

Embodiment 18

Figure 18:
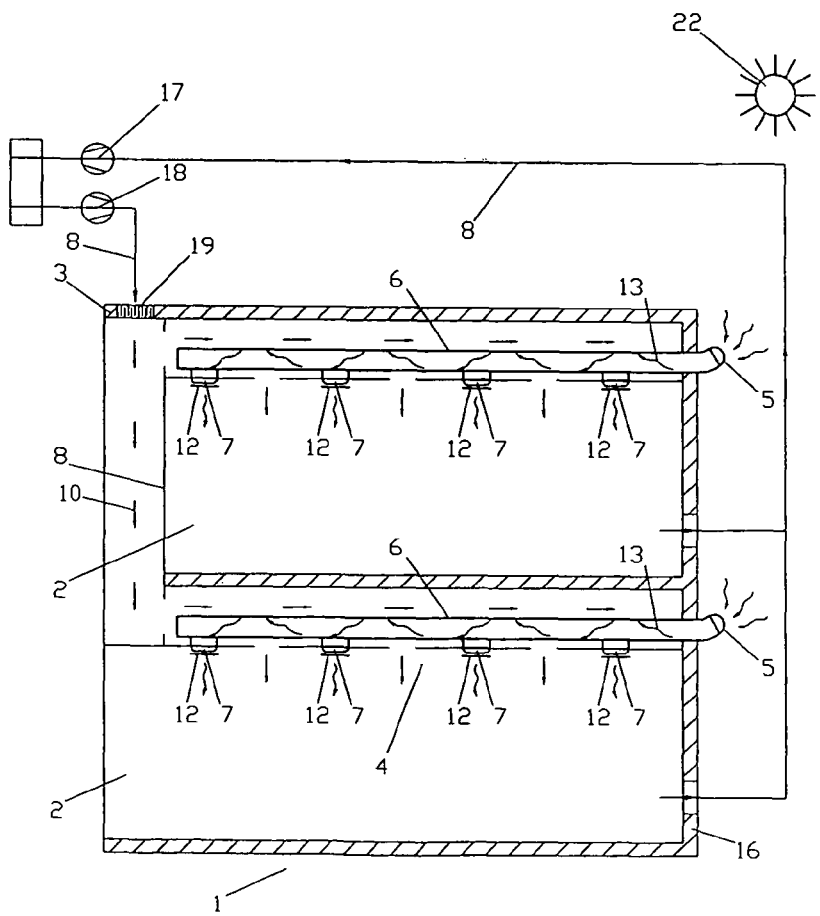
FIG. 18 is a full section view of light-pipe system with structure for mechanical ventilation and photocatalytic air purification mounted on the sidewall of multi-floors of a building.

FIG. 18 shows the light-pipe system 4, which is similar to that of FIG. 17. The only difference is that the system 4 can be fitted to multi-floors of buildings.

Embodiment 19

Figure 19:
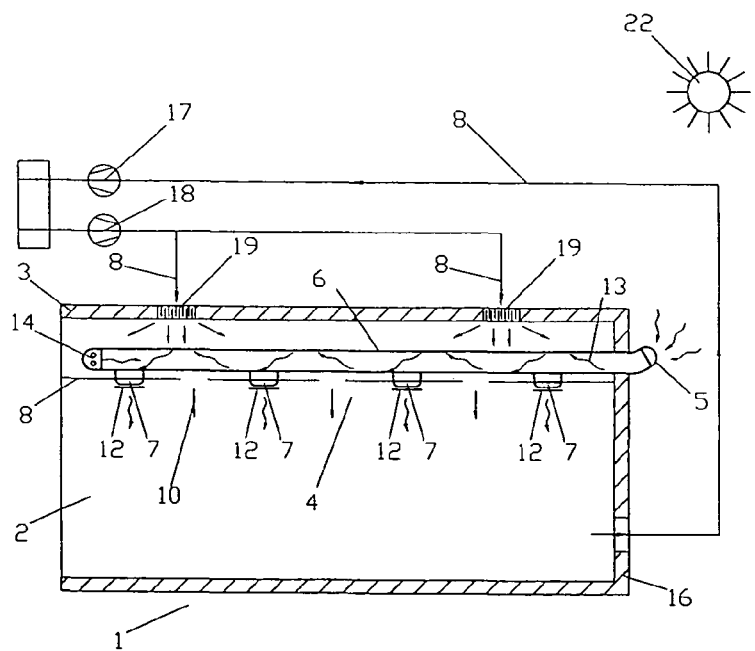
FIG. 19 is a full section view of light-pipe system with structure for mechanical ventilation, photocatalytic air purification and artificial lighting mounted on the sidewall of a room.

FIG. 19 shows the light-pipe system 4, which is similar to that of FIG. 17. The only difference is that the artificial light 14 is installed at the other end of light-pipe 6, so that the room 2 can be provided with daylight, artificial light or with a mixture of both.

Embodiment 20

Figure 20:
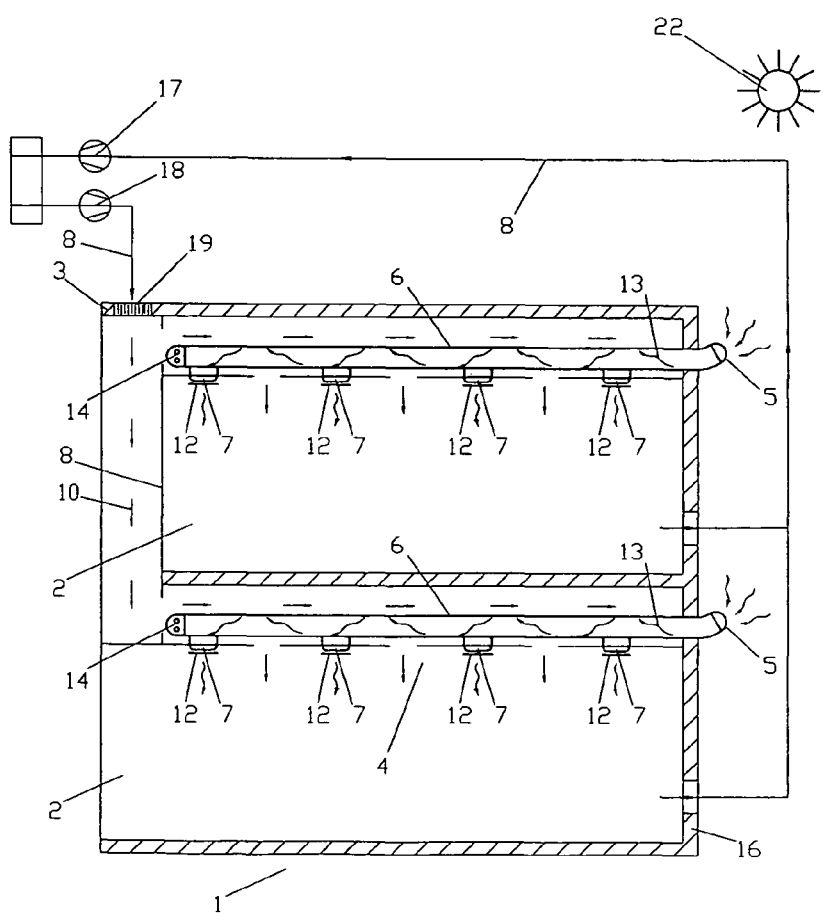
FIG. 20 is a full section view of light-pipe system with structure for mechanical ventilation, photocatalytic air purification and artificial lighting mounted on the sidewall of multi-floors of a building.

FIG. 20 shows the light-pipe system 4, which is similar to that of FIG. 19. The only difference is that the system 4 can be fitted to multi-floors of a building 1.

Embodiment 21

Figure 21:
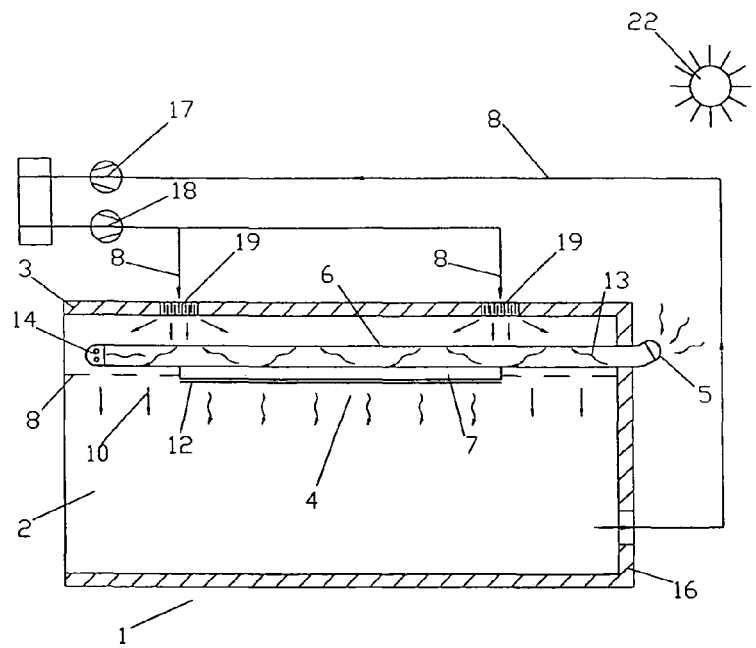
FIG. 21 is a full section view of slot type light-pipe system with structure for mechanical ventilation, photocatalytic air purification and artificial lighting mounted on the sidewall of a room.

FIG. 21 shows the light-pipe system 4, which is similar to that of FIG. 19. The only difference is the light-pipe is a slot type.

Embodiment 22

Figure 22:
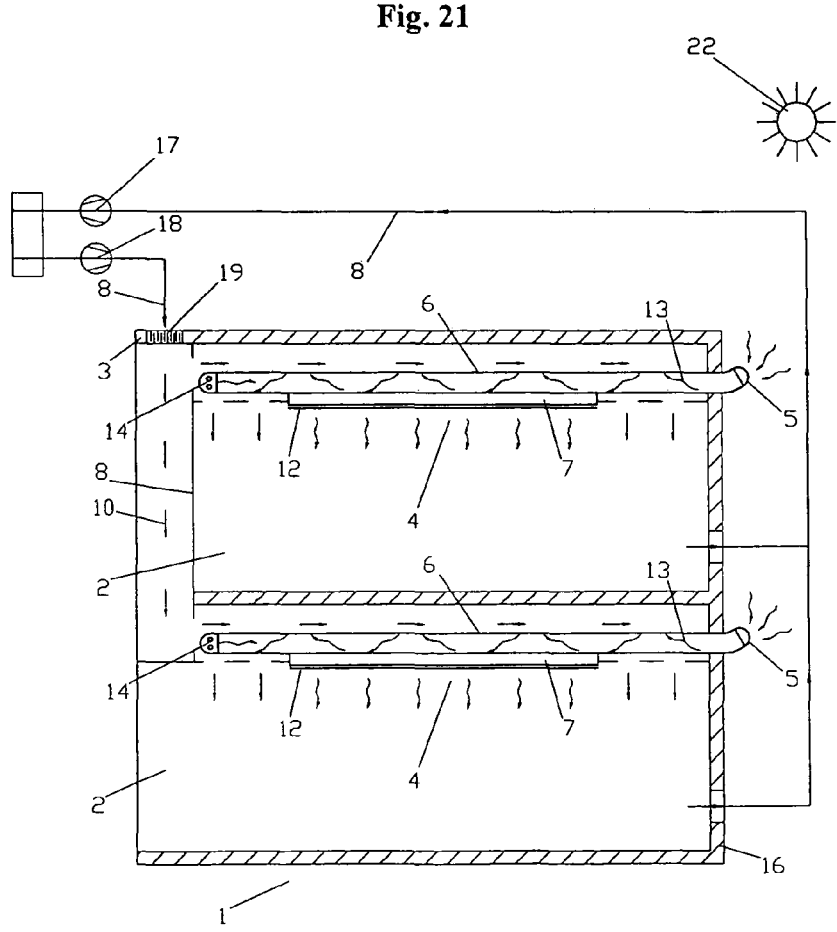
FIG. 22 is a full section view of slot type light-pipe system with structure for mechanical ventilation, photocatalytic air purification and artificial lighting mounted on the sidewall of multi-floors of a building.

FIG. 22 shows the light-pipe system 4, which is similar to that of FIG. 21. The only difference is that the system 4 can be fitted to multi-floors of a building 1.

Embodiment 23

Figure 23:
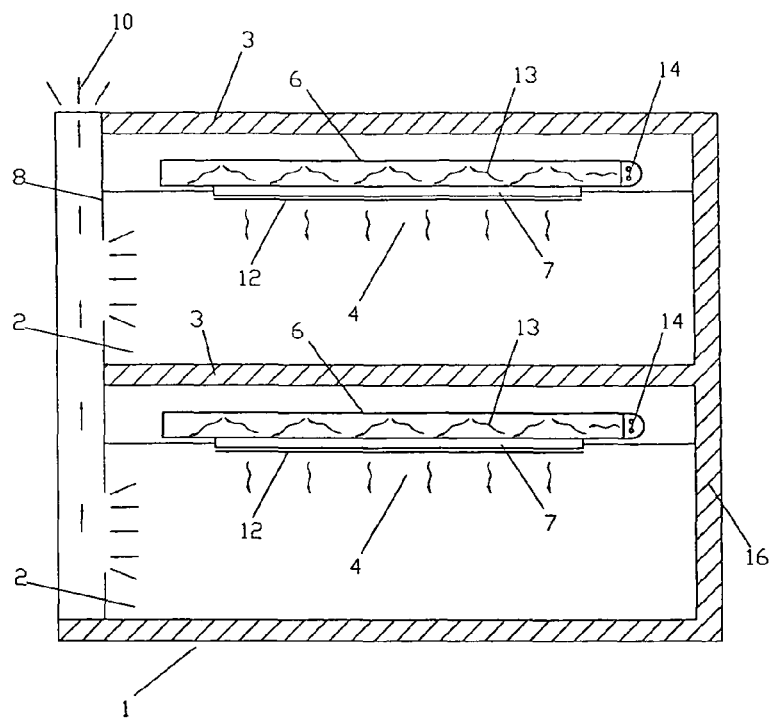
FIG. 23 is a full section view of light-pipe system with structure for natural ventilation, photocatalytic air purification and artificial lighting mounted on the sidewall of multi-floors of a building.

FIG. 23 shows a building 1, at least having a room 2 with a roof 3. The light-pipe system 4 for natural ventilation and photocatalytic air purification is installed on the roof 3 of room 2. The indoor lighting is realized by the artificial light source 14 through the slot type light-pipe 6. The nanometer photocatalyst (titanium free composite oxide) 12 is coated on the surface of slot type emitter 7 of light-pipe 6. Under the illumination of light conducted by light-pipe, the indoor air can be purified. The indoor air, preferably with natural movement, passes out of the room through air duct 8, so that air exchange from indoor to outdoor can be realized. This light-pipe system can provide artificial lighting, photocatalytic air purification and natural ventilation.

Embodiment 24

Figure 24:
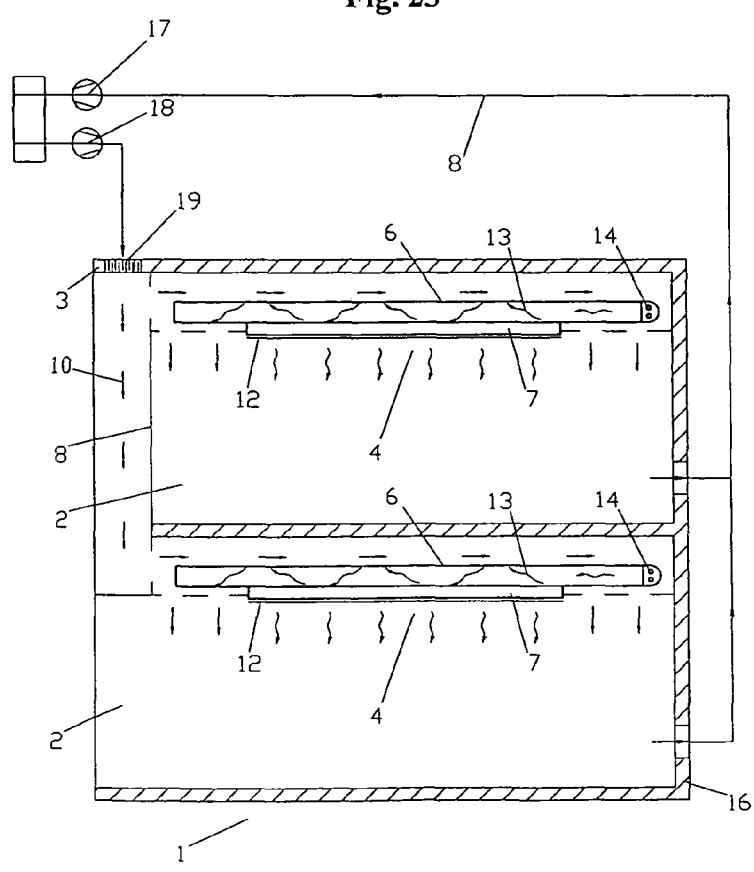
FIG. 24 is a full section view of slot type light-pipe system with structure for mechanical ventilation, photocatalytic air purification and artificial lighting mounted on the ceiling of multi-floors of a building.

FIG. 24 shows the light-pipe system 4, which is similar to that of FIG. 23. The only difference is that air exchange is realized through mechanical ventilation.

Embodiment 25

Figure 25:
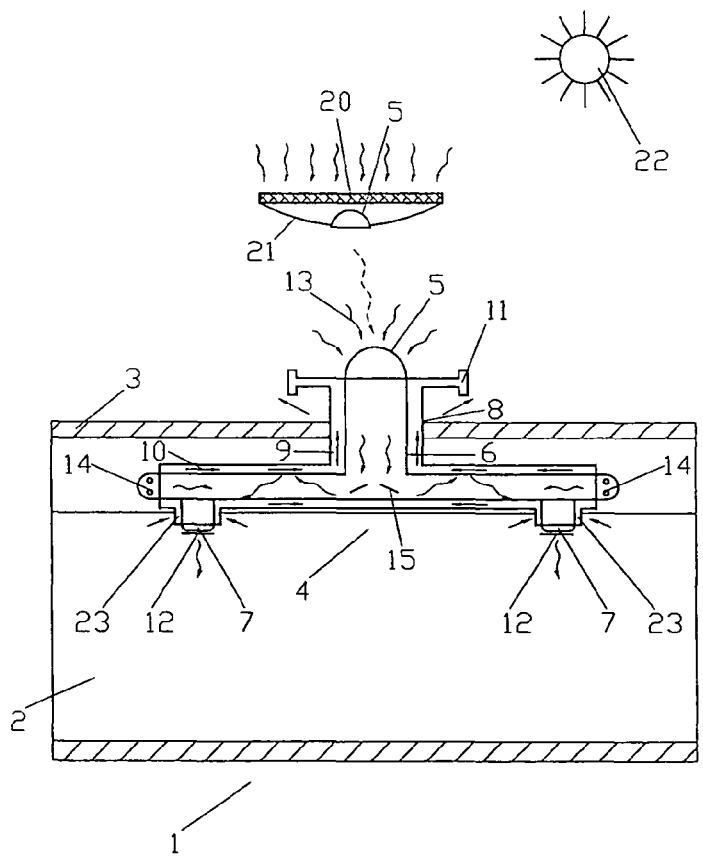
FIG. 25 is a full section view of light-pipe system with structure for natural ventilation, photocatalytic air purification, artificial lighting and light storage material lighting mounted on the ceiling of a room.

FIG. 25 shows a light-pipe system 4, which can be any one of the systems shown in FIGS. 1 to 24. The only difference is that the light storage material 20 is used as the light source of light-pipe system 4. The light storage material 20 can store the light under the exposure of the daylight from sun 20, and then release the light slowly at night. At night, the light released from light storage material 20 can be collected by light collector 21, and then is conducted to the collector 5 of light-pipe 6. The light-pipe system 4 thus lights the building along the light-pipe by daylight from sun 22 in daytime and by light storage material 22 at night. FIG. 25 shows the system similar to that of FIG. 3, but which adds light storage material 20 and light collector 21. This light-pipe system can provide daylight, artificial light 14, and light storage material 20 or a mixture of them.

Embodiment 26

Figure 26:
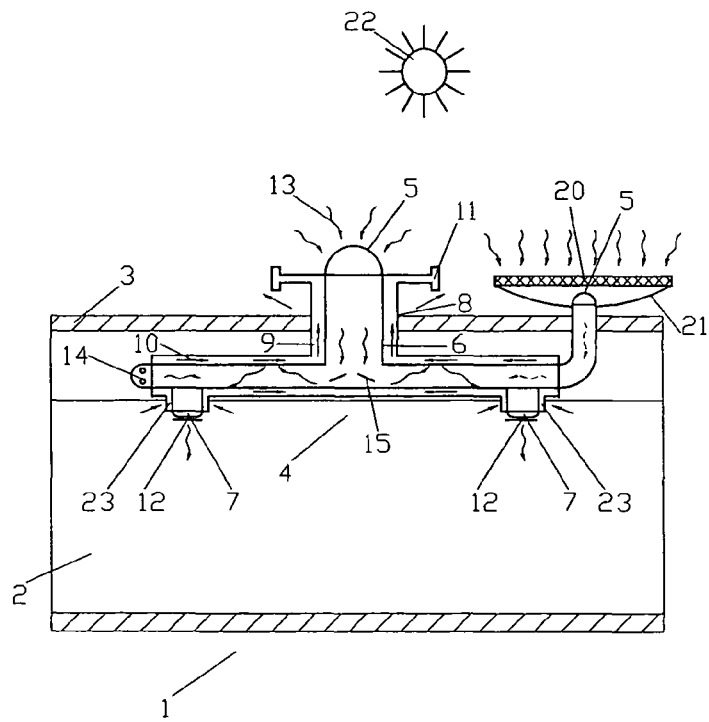
FIG. 26 is another full section view of light-pipe system with structure for natural ventilation, photocatalytic air purification, artificial lighting and light storage material lighting mounted on the ceiling of a room.

FIG. 26 shows the light-pipe system 4, which is similar to that of FIG. 25. The only difference is that the light from the light storage material 20 is collected by light collector 21 and then is sent into the light-pipe 6 directly. In the daytime, the light from sun 22 is collected by collector 5 of vertical light-pipe 6 and then is transferred into the room 2 through horizontal light-pipe 6 and light ports (emitter is fitted to the light port) 7. At night, the light from light storage material 20 can illuminate the room 2. The nanometer photocatalyst is coated on the surface emitter 7. Under the illumination of light from light-pipe the indoor air can be purified. The light source of light-pipe system can be daylight, artificial light 14, light storage material 20 or with a mixture of them.

Embodiment 27

Figure 27:
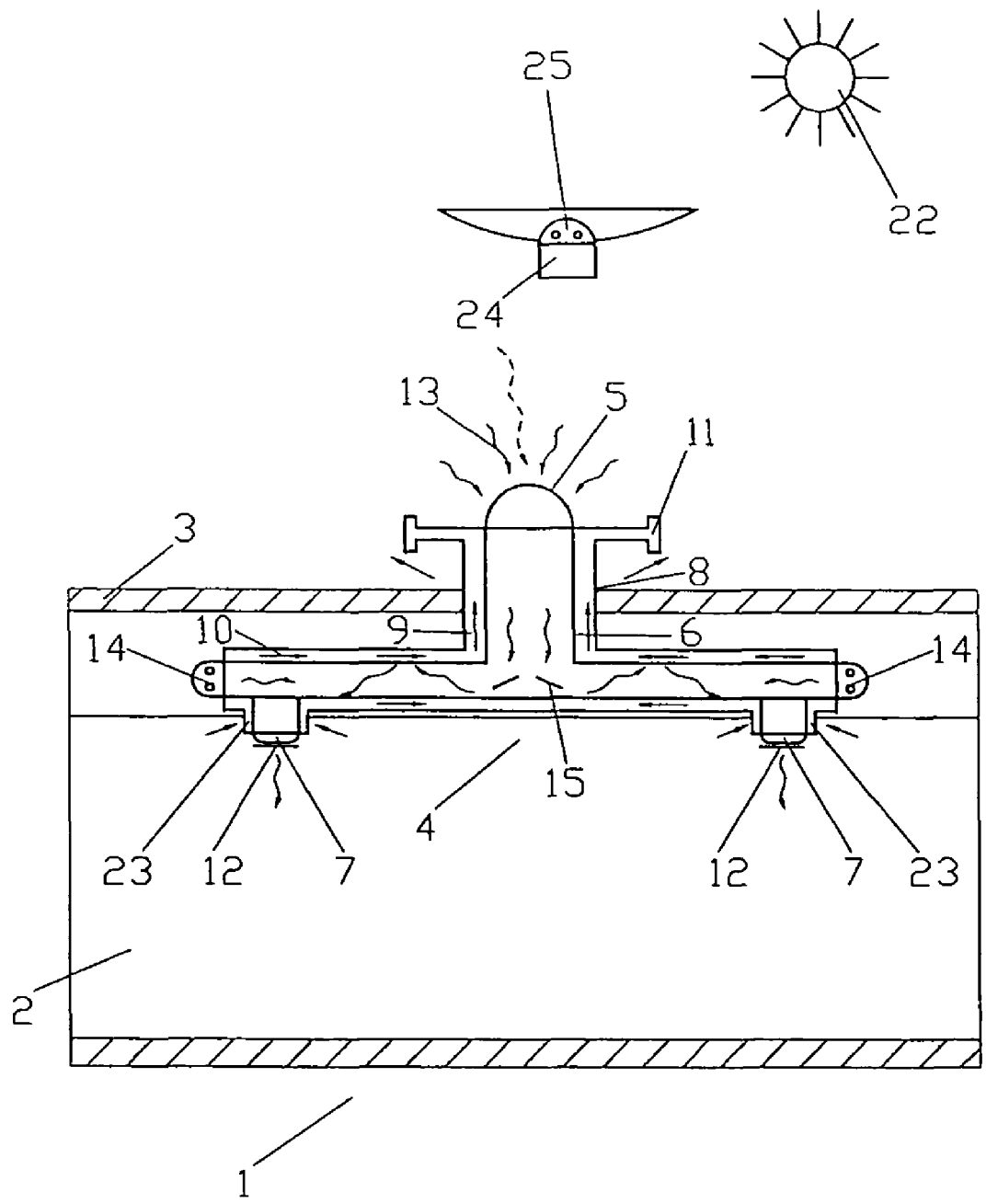
FIG. 27 is a full section view of light-pipe system with structure for natural ventilation, photocatalytic air purification, artificial lighting mounted on the ceiling of a room, of which the sunlight collector and sun tracer are connected on the light-pipe.

FIG. 27 shows the light-pipe system 4, which is similar to that of FIG. 25. The only difference is that the sunlight collector 25 and sun tracer 24 are adopted to improve light transport. Sun tracer 24 can track the sun all day so that the collected light can reach an optimum.

Having thus disclosed a number of alternative embodiments, what is claimed is:

1. A light-pipe system for conducting/distributing air and light and purifying indoor air in a building, the system comprising a light-pipe device, a ventilation passage and a photocatalyst film, the light-pipe device having:
   (i) a light collector for collecting sunlight;
   (ii) a light-pipe tube, and
   (iii) an emitter fitted to an end of the light-pipe tube for diffusing light, the light-pipe tube and the ventilation passage being disposed coaxially by arranging the passage outside the tube, and air flow being passed through an annular air passage formed between the light-pipe tube and the ventilation passage, the photocatalyst film being coated on the outer surface of the emitter contacting with the indoor air for purifying the indoor air by illumination of the sunlight conducted from the light-pipe tube.

2. The light-pipe system of claim 1, wherein light collected by said light collector may be sunlight, artificial light, light storage material, a mixture of sunlight and artificial light, a mixture of sunlight and light storage material or a mixture of sunlight, light storage material and artificial light.

3. The light-pipe system of claim 1, wherein said ventilation passage may comprise a building ventilation wall.

4. The light-pipe system of claim 1, further comprising a sunlight collector installed on said collector of said light-pipe device.

5. The light-pipe system of claim 4, further comprising a sun tracker mounted on said sunlight collector.

6. The light-pipe system of claim 1, wherein said photocatalyst film comprises a chemical coating, a physical coating, or a mixture of both, said coating having nanometer $TiO_2$, nanometer modified $TiO_2$, nanometer modified mesopore $TiO_2$, or nanometer free composite oxide.

7. The light-pipe system of claim 6, wherein the photocatalyst film contains an absorptive material which can absorb polluted gas.

8. The light-pipe system of claim 1, wherein said light-pipe tube is located coaxially inside said ventilation passage whereby light is conducted through the light-pipe device, whereas air may flow through said annular passage between the ventilation passage and the light-pipe tube.

9. The light-pipe system of claim 1, wherein the light-pipe tube and the ventilation passage are on different axes.

10. The light-pipe system of claim 8, wherein the air flow is conducted in a direction to ventilate different rooms of said building.

11. The light-pipe system of claim 1 further comprising air and light ports at intervals along the light-pipe tube and the ventilation passage through which air and light may pass.

\* \* \* \* \*